Oct. 4, 1960

J. E. DUFF 2,954,802

FLEXIBLE HOSE

Filed Jan. 26, 1955

Oct. 4, 1960   J. E. DUFF   2,954,802
FLEXIBLE HOSE

Filed Jan. 26, 1955   2 Sheets-Sheet 2

— 
United States Patent Office 2,954,802
Patented Oct. 4, 1960

2,954,802
FLEXIBLE HOSE

Jack E. Duff, Canton, Ohio, assignor to The Hoover Company, North Canton, Ohio, a corporation of Ohio Filed Jan. 26, 1955, Ser. No. 484,205

1 Claim. (Cl. 138—56)

The present invention relates to flexible and extensible hose and more particularly to a hose especially adapted for use with suction cleaners.

The hose of the present invention is an improvement over the hose disclosed and claimed in my copending application, Serial No. 415,256, filed March 10, 1954, now U.S. Patent No. 2,739,616, dated March 27, 1956.

The hose disclosed and claimed in my copending application comprises a closely coiled cylindrical reinforcing element in which the turns thereof are so stressed as to tend to return into contact with each other when free to do so. The cylindrical reinforcing element is formed of a coiled wire sheathed within a covering of thermoplastic material. The hose is formed by stretching the coiled reinforcing element on a mandrel so that its turns are spaced apart. A single thickness thermoplastic tube of the same length as the stretched coil and having an inside diameter less than that of the coil is then assembled over the stretched coil so that the tube wall contracts about the turns of the coil. The carcass thus formed is removed from the mandrel and heat treated in a warm water bath at from 165° to 180° F. The heat treatment will soften the tube wall and relax the stresses therein so that the turns of the coiled reinforcing element will move toward each other, and the tube wall will move inwardly between the turns of the coil to form a continuous deep spiral fold extending from one end of the hose to the other with the walls of the fold in substantial contact with each other. The carcass thus formed is then allowed to cool to room temperature whereby the tube wall takes a permanent set in the abovedescribed position.

As a result, a very flexible and extensible hose is formed such that it is only necessary that the folds of the tube walls straighten out when the hose is flexed or stretched.

The hose of the present invention differs over the abovedescribed hose in that its flexibility and stretchability continuously varies from one end thereof to the other. At one end, the folds of the tube wall are comparatively shallow, while at the other end they are comparatively deeper. The depths of the folds become progressively deeper from the shallow end to the deeper end.

As a result, the finished hose, according to the present invention, is very flexible and extensible at one end and less flexible and extensible at the other end.

The hose of the present invention has particular utility with a suction cleaner in which the hose is swiveled to a tank or canister type cleaner. At the cleaner end of the hose it is not necessary that the hose be ultraflexible; but at the cleaning tool of the hose, it is necessary that the hose be very flexible and extensible. Thus, the hose of the present invention may be arranged with its less flexible end attached to the cleaner.

The hose, according to the present invention, is formed by placing a cylindrically close coiled reinforcing element about a mandrel while it is held in a vertical position. The natural weight of the turns of the coil will progressively distribute the turns along the mandrel. The turns at the top of the mandrel will be spaced relatively farther apart than those at the bottom because of the greater weight on the upper coils than on the lower ones. Thus, the spacing of the turns will become progressively less from the top end of the mandrel to its bottom end.

In its above described suspended position, the coiled reinforcing element will have a definite length depending upon the number of turns in the coil. While the coil is in its abovedescribed suspended position, a thermoplastic tube having a smaller inside diameter than that of the coil is assembled about the coil and permitted to contract about the turns of the coil to thus hold them in their progressively differentially spaced positions with the wall of the tube entering between the turns of the coil in which the material of the tube wall between the turns is wide at the top end of the coil and narrower at its bottom end.

The carcass thus formed is removed from the mandrel and placed in a warm water bath at from 165° to 180° F. The heat thus applied will soften the tube and relax the stresses therein whereby the turns of the coil will return towards each other to the maximum extent possible. As a result, the spiral fold in the tube wall will be very deep at the top end of the coil and shallower at its bottom end, thus forming a hose having a tapered interior when in its unstretched condition, but capable of being stretched to straighten out the folds.

The carcass is then permitted to cool to room temperature whereby the tube wall will take permanent set in the abovedescribed position, forming a hose length which is very flexible and extensible at one end and less flexible and extensible at the other end, being progressively more and more flexible and extensible from one end to the other.

The less flexible end of the hose may be attached to a fitting swivelled to a canister type cleaner where flexibility and extensibility is unimportant; while the more flexible end may be attached to cleaning tools where flexibility and extensibility is necessary and desirable.

Other objects and advantages of the present invention will become apparent as the description proceeds when taken in connection with the accompanying drawings in which.

Figure 1:
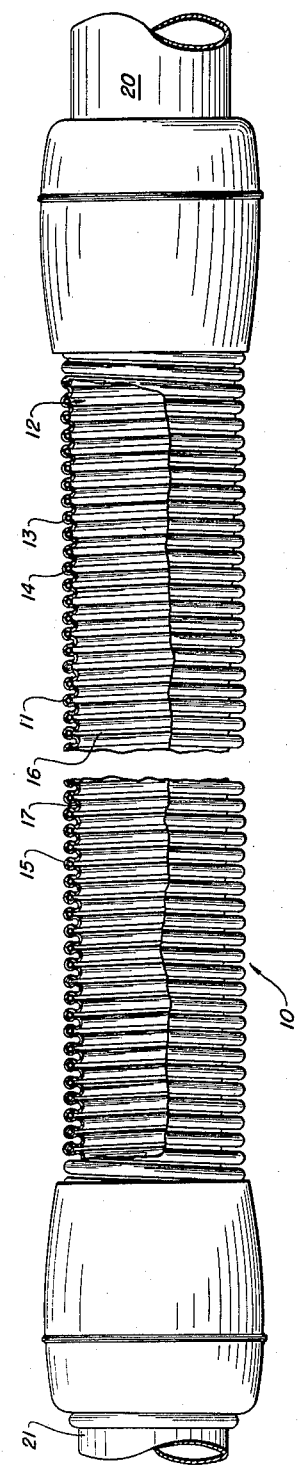
Fig. 1 is a longitudinal view, partly in section, of the finished hose of the present invention.

The completed hose 10 of the present invention as shown in Fig. 1 comprises a thermoplastic tube 11 surrounding a cylindrically coiled reinforcing element 12 in the form of a sheath 13 surrounding a coiled wire 14. The tube 11 is formed with outwardly extending corrugations 15 in which the turns 16 of the reinforcing element are positioned and with inwardly extending spiral folds 17 lying between the turns 16 of the reinforcing element.

Figure 2:
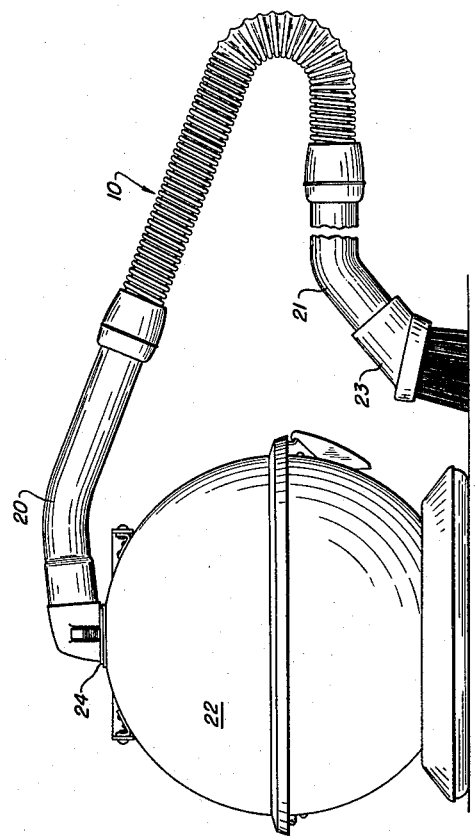
Fig. 2 is a view showing one use to which the hose of the present invention may be put.

Attached to the ends of the hose 10 are suitable fittings 20, 21. Fitting 20 is formed for attachment to the suction inlet opening of a suction cleaner 22 and the fitting 21 for attachment to a cleaning tool 23 as shown in Fig. 2.

Adjacent to the fitting 20 to be attached to the cleaner 22, the inwardly extending fold 17 of the tube is not as deep as adjacent to the fitting 21, to be attached to the cleaning tool 23, and the folds become progressively deeper from the fitting 20 to the fitting 21.

As a result, the hose 10 is more flexible at the tool end than at the cleaner end which is desirable. Fitting 20 is swiveled at 24 to the cleaner 22 so that the hose 10 need not have much flexibility at that end since it is merely moved about the cleaner 22 with the fitting 20. However, at the tool end, the tool is manipulated, and it is desirable that the hose be more flexible and extensible at that end.

As shown in Fig. 1, the inwardly extending fold 17 in the hose wall is deeper at the cleaning tool end 21 than at the cleaner end with the result that the hose is much more flexible and extensible at the tool end whereby the cleaning tool 23 may be easily manipulated.

It is to be noted that the hose 10 in its unstretched condition as shown in Fig. 1 forms a tapered interior being of smaller diameter at the end 21 and of larger diameter at the end 20. That comes about by reason of the deeper corrugations 17 at the end 21. That feature is advantageous in that it will cause the air velocity to be greater at the tool end than at the cleaner end of the hose resulting in a better cleaning effectiveness. However, when the hose is stretched lengthwise, the fold 17 will flatten out; and since the pull will be on the end 21, the corrugations at that end will be the first to straighten out so that under certain conditions the interior diameter of the hose may be substantially uniform throughout.

In making the hose of the present invention, the reinforcing element 12 is precoiled so that its turns 16 tend to move into contact with each other. Since the wire 14 is of small diameter and the steel is comparatively heavy, the weight of the turns will cause them to be spaced apart widely at the top and closer together at the bottom. That principle is used in making the hose of the present invention.

Figure 3:
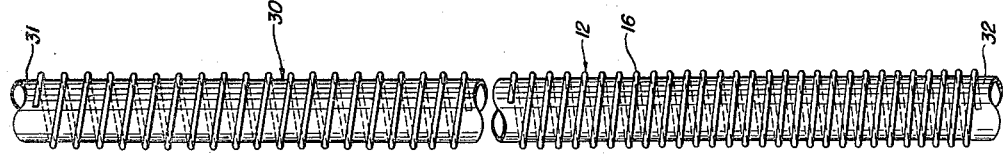
Fig. 3 is a view showing the manner by which the turns of the reinforcing element are spaced apart progressively from one end of the hose to the other.

The coil 12 is freely suspended as shown in Fig. 3 in a vertically extended position about an expansible mandrel 30. It is to be noted that the weight of the coil 12 causes the turns 16 to be spaced farther apart at the top end 31 than at the bottom end 32, the turns being progressively spaced farther apart from the bottom end 32 to the top end 31 due to the weight of the turns of the coil.

In the position shown in Fig. 3, the mandrel 30 is expanded against the individual turns 16 of the coil 12 to anchor them in their progressively differentially spaced positions. Thereafter, the tube 11 having a smaller inside diameter than that of the coil 12 and of the same length as the expanded coil is expanded and assembled over the coil 12 and mandrel 30 and caused to contract about the turns 16 of the coil 12 to exteriorly anchor them in their progressively differentially spaced position.

Figure 4:
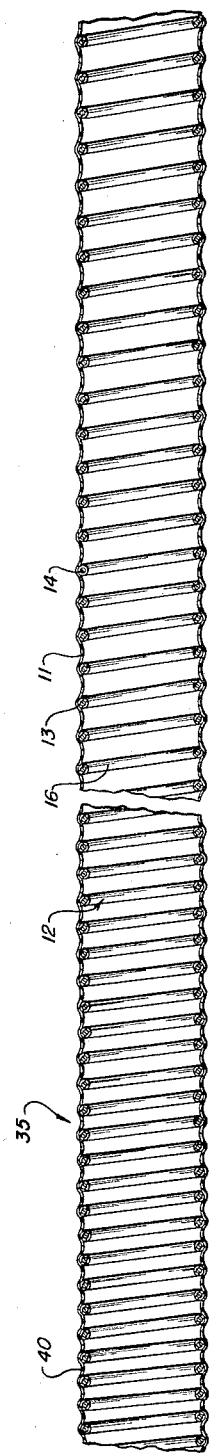
Fig. 4 shows the hose carcass as it is removed from the mandrel of Fig. 3 and ready to be heat treated.

The mandrel 30 is then collapsed to release the individual turns 16 of the coil 12 which will permit them to move toward each other to some extent as far as permitted by the wall of the tube 11. That position is shown in Fig. 4, it being noted that at 40 the wall of the tube 11 has started to move inwardly between the turns 16 of the coil 12 to form the genesis of the deep corrugations 17 of Fig. 1. It is also to be noted that there is a greater length of tube wall between the turns 16 at the right hand end of Fig. 4 than at the left hand end and that the length of that wall decreases progressively from right to left. The lengths of tube wall between the turns 16 will eventually form the progressively deeper corrugations 17 of Fig. 1.

The carcass 35 of Fig. 4 is then immersed in a warm water bath at from 165° to 180° F. which will soften the tube wall 11 and release the stresses therein to permit the turns 16 to move toward each other and cause the fold 17 of the tube wall to be formed. Because of the greater length of the tube wall 40 between the turns 16 at one end of the carcass 35, the tube wall will move inwardly farther at one end than at the other end to form the deeper corrugations at one end than at the other.

From the foregoing it is evident that the present invention provides a flexible and extensible hose for use with a suction cleaner in which the hose at the tool end is ultraflexible and extensible and is less flexible and extensible at the end which is to be attached to the suction cleaner.

Also from the foregoing, it is evident that the present invention involves a novel method in which a hose of the foregoing characteristics may be made.

While I have shown and described but a single embodiment of my invention, it is to be understood that that embodiment is to be taken as illustrative only and not in a limiting sense. I do not wish to be limited to the particular structure and method shown and described, but wish to include all equivalent variations thereof except as limited by the scope of the claim.

I claim:

An extensible flexible hose comprising, a cylindrical spirally wound reinforcing coil axially tensioned so that the turns thereof tend to move toward each other when free to do so, and a thin walled tube of elastomeric thermoplastic material having a normal inside diameter less than that of said coil surrounding said coil, the wall of said tube when in its normal static unextended condition having an inwardly facing spiral fold extending the entire length thereof in which the turns of said coil are positioned and having an outwardly facing spiral fold extending the full length thereof with the walls between said folds normally lying close to each other between adjacent turns of said coil and in contact with adjacent turns of said coil so as to form substantially closed loose loops between adjacent turns of said coil and normally extending inwardly beyond the inner periphery of the turns of said coil, said loops being substantially closed between adjacent turns of said coil and being so shaped inwardly of said turns as to provide excess material in the walls of said loops which unfold when the hose is extended without stretching the material forming the walls of said loops, the depth of said loops being progressively deeper from one end of said hose to the other so that length of the material forming said loops progressively increases from one end of the hose to the other to provide progressively more material between the turns of said coil to be unfolded as the hose is axially extended or flexed whereby said hose is progressively more flexible and extensible from one end thereof to the other.

References Cited in the file of this patent

UNITED STATES PATENTS

| | | |
|---|---|---|
| 1,165,449 | Rietz | Dec. 28, 1915 |
| 1,547,431 | Mallory | July 28, 1925 |
| 2,385,389 | Toepper et al. | Sept. 25, 1945 |
| 2,516,864 | Gilmore et al. | Aug. 1, 1950 |
| 2,560,369 | Roberts | July 10, 1951 |
| 2,661,025 | Brace | Dec. 1, 1953 |
| 2,739,616 | Duff | Mar. 27, 1956 |